Sept. 13, 1927.
D. McDOUGALL
1,642,376
FOOT ACCELERATOR FOR MOTOR CYCLES
Filed Nov. 12, 1926
2 Sheets-Sheet 1
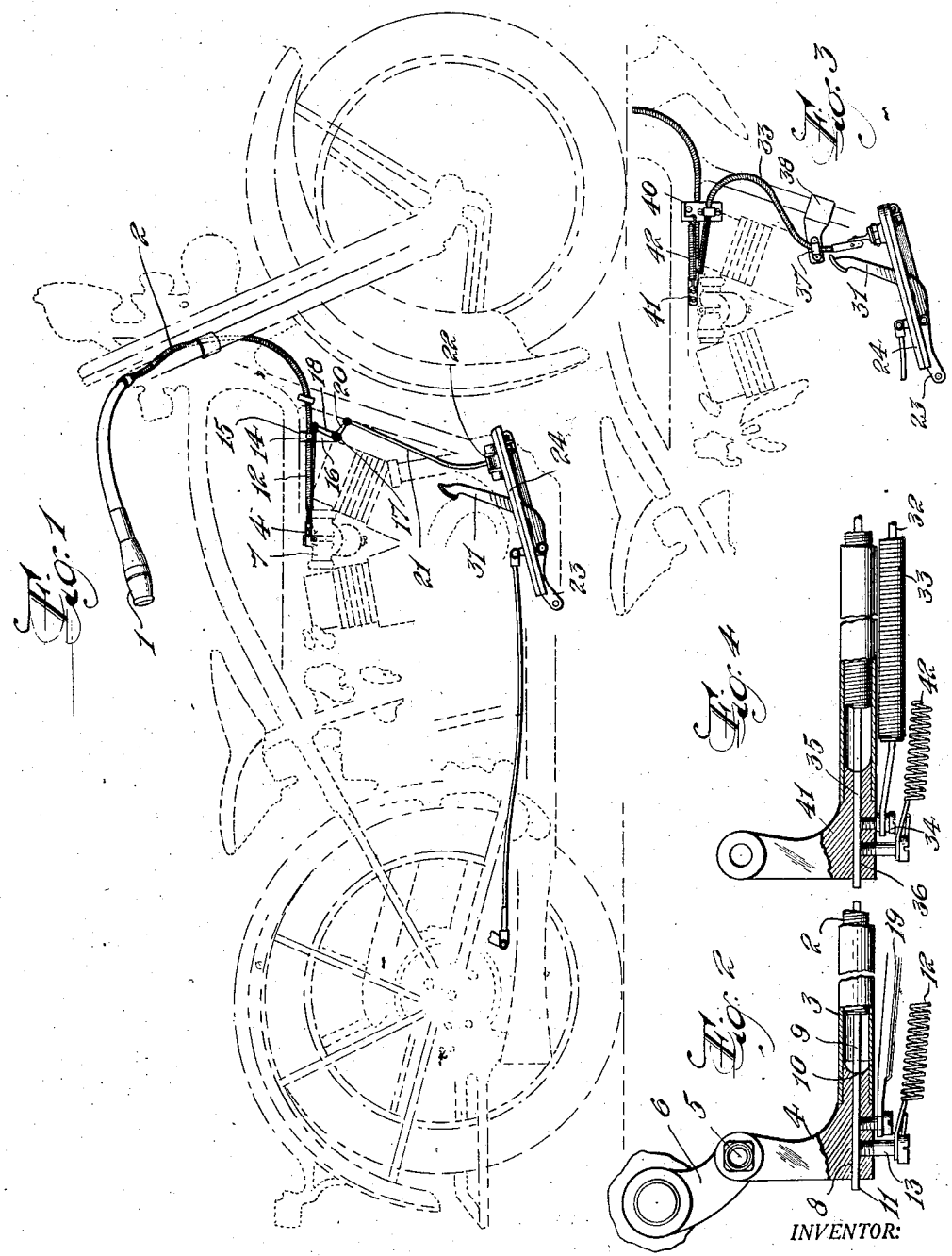
INVENTOR:
BY Donald McDougall,
Everett & Rook ATTORNEYS.

Sept. 13, 1927.
D. McDOUGALL
1,642,376
FOOT ACCELERATOR FOR MOTOR CYCLES
Filed Nov. 12, 1926
2 Sheets-Sheet 2
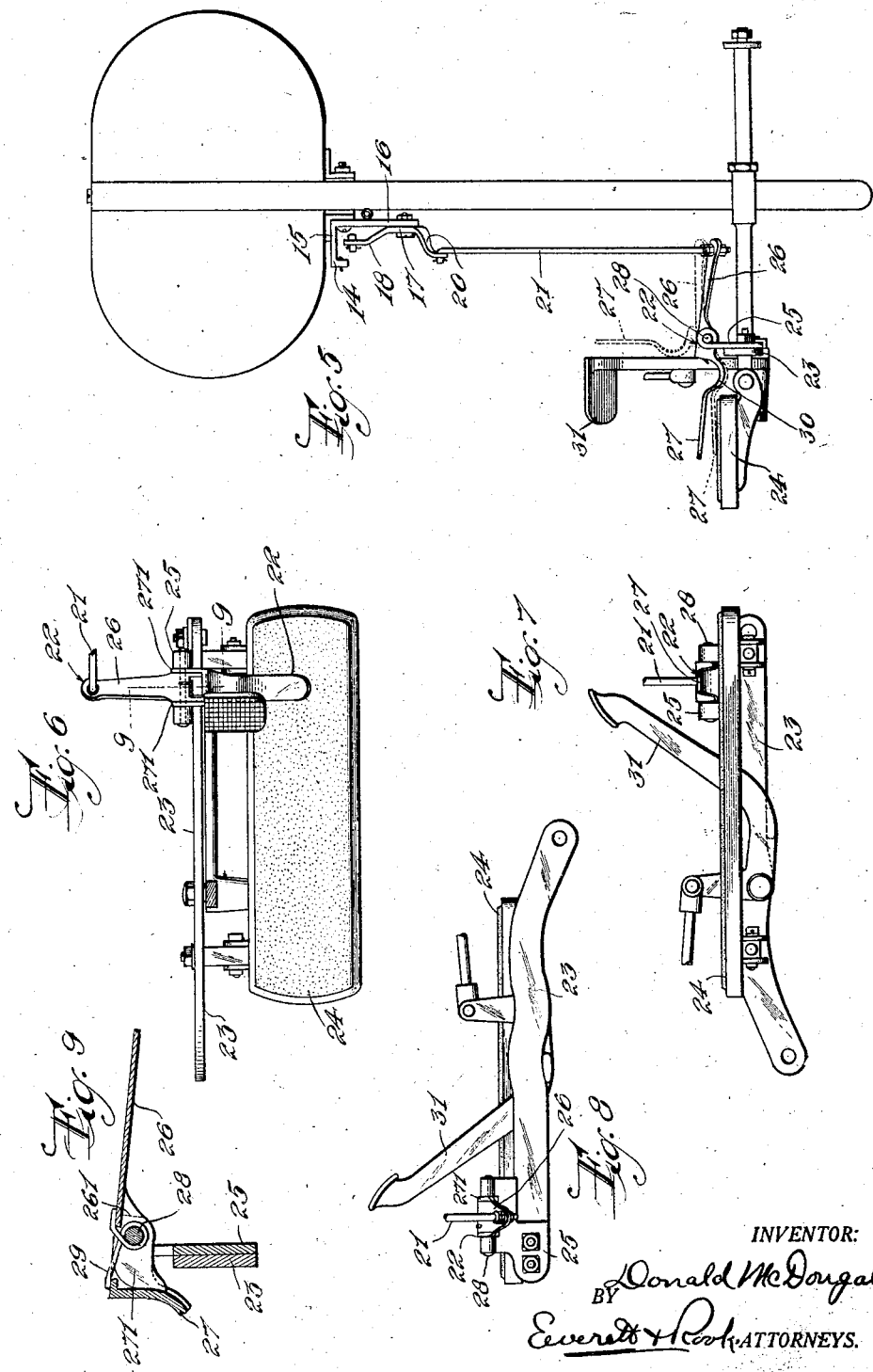

Patented Sept. 13, 1927.

1,642,376

UNITED STATES PATENT OFFICE.

DONALD McDOUGALL, OF NEWARK, NEW JERSEY.

FOOT ACCELERATOR FOR MOTOR CYCLES.

Application filed November 12, 1926. Serial No. 147,887.

Heretofore in motorcycles the gas throttle has been controlled by twisting or turning one of the handle-bars, and in some uses of motorcycles, as for example by policemen, the result has been that if the policeman has occasion to take his hand off the handle-bar for some other purpose, such as using his gun, he loses control of the motorcycle, so far as acceleration is concerned. It has been sought to remedy this by applying the control to the left handle-bar, but obviously it is sometimes necessary or desirable for the officer to remove his left hand, for some purpose or other, and thus he loses control of the acceleration. In such work as that of a motorcycle officer upon a crowded highway it has become in this day and time a very serious and dangerous handicap for the rider to lose control even momentarily, of the acceleration of his motorcycle, and not only does it lead to great danger both to the motorcyclist and others upon the road, but also it greatly handicaps an officer in his work.

The objects of this invention are to enable the driver of a motorcycle to control the gas throttle by means of his foot and thus leave his hands free for other purposes; to secure such a foot control as will not interfere with the usual control through the handle-bars, so that either control can be used as desired; to secure for the control a construction and arrangement of treadle at the usual foot-board which will operate without interference with other adjacent parts; to secure a treadle which will fold idly with the foot-board in case the motorcycle laid upon its side; to secure a construction which can be applied to motorcycles already in use, without reconstruction of them, and to obtain other advantages and results as may be brought out by the following description.

Referring to the accompanying drawing, in which like characters of reference indicate the same parts throughout the several views, Figure 1 is a side elevation of a motorcycle having my invention applied thereto, the parts of the invention and other parts closely related thereto being shown in full lines and the rest of the motorcycle in dotted lines, for greater clearness;

Figure 2 is a detail plan view, partly in section, adjacent to the carbureter;

Figure 3 is a side elevation of a modified form of my invention;

Figure 4 is a detail plan, partly in section, of the parts of said modified construction adjacent the carbureter;

Figure 5 is a front elevation of the parts of my improved control and some adjacent parts of the motorcycle;

Figure 6 is a plan of the foot-board at which my improved control is applied;

Figure 7 is a side elevation of the same;

Figure 8 is an elevation of the same viewed from its side next the motorcycle, and Figure 9 is a detail section of the control treadle, on line 9—9 of Fig. 6, looking in the direction indicated by the arrow.

In said drawings, and particularly Figure 1, the reference numeral 1 indicates the handle-bar nearest the observer and by turning or twisting of which the gas throttle is commonly controlled by a wire leading through the flexible casing 2 as is common and well-known. In carrying out my invention in its preferred form, as further illustrated in Figure 2, said flexible casing extends into the end of a cylindrical socket 3 projecting from an elbow 4 which is pivoted as at 5 to the arm 6 of the control or butterfly valve, not shown, of the carbureter 7, see Figure 1. The wire extending from the handle-bar through the flexible casing has heretofore extended through a hole 8 drilled in the elbow 4 and when properly adjusted has been clamped therein by set screws, so that as the wire moved back and forth longitudinally, upon twisting the handle-bar 1, the elbow 4 was reciprocated and the valve of the carbureter opened or closed as desired.

In my improved construction, I sever the wire 9 at the entrance to the hole 8 in the elbow, as at 10, and leave the end 11 clamped in the hole 8 to close the same. The said wire 9 thus merely abuts against the elbow 4 and will move the same in only one direction, that is when it pushes against said elbow 4. The elbow is normally held at the extremity of its movement in the other direction, which closes the carbureter valve, by means of a spring 12 preferably extending from one of the set screws 13 which clamps the wire end 11, to the laterally extending arm 14 of a bracket 15 secured to the tank of the motorcycle, as shown in Figures 1 and 5, or any other stationary part.

The other or downwardly extending arm 16 of the bracket 15 has fulcrumed upon itself a bell-crank lever 17 whose upwardly projecting arm 18 is joined by a connecting rod 19 to the elbow 4 so as to push the same against the pull of the spring 12, or in the same direction as the wire 9. From the other or forwardly projecting arm 20 of the bell-crank 17 a connecting rod 21 extends downward to the inner end or arm of a treadle 22 mounted upon the usual support 23 for the usual foot-board 24 by means of a suitable bracket 25 bolted to said support. This treadle comprises an inner arm 26 and an outer arm or pedal 27, having ears 261 and 271, respectively, see Figure 9, by which the arms are pivoted upon the same pin 28 in the bracket 25, the ears 261 of the inner arm projecting forwardly beneath the outer arm 27 so that upon downward movement said outer arm will swing the inner arm and upon upward movement the outer arm will alone move, both actions being shown in dotted lines in Figure 5. A spring 29 normally holds said arms in alinement, as shown in Figure 9, and the outer arm, first curving downward as at 30 to afford clearance for the usual brake pedal 31, projects outward over the foot-board 24 in such relation thereto that when depressed, as shown dotted in Figure 5, said board forms a stop to prevent too great depressive force being applied. The hinging of the outer arm with respect to the inner arm is to enable it to fold up with the foot-board when the motorcycle falls or is laid over upon its side, as said foot-board is usually constructed to do.

With my improved control applied to a motorcycle, the rider can accelerate by turning or twisting the handle-bar 1 to slide the wire 9 and move the elbow 4, against the pull of the spring 12, to open the valve attached to the arm 6, or he can press his foot upon the treadle 22 and swing the bell-crank 17 to move the elbow 4, through the connecting rod 19, against the pull of the spring 12. Said spring 12 normally holds the accelerator valve in closed position, and, as has been explained, if the motorcycle falls on its side the outer arm of the treadle closes upward with the foot-board and is not damaged.

Instead of the bell-crank 17 and the connecting rods 19, 21, which have been described above, other means may be employed for transmitting movement from the foot pedal to the elbow 4, and in Figures 3 and 4 I have illustrated such other means as a wire 32 within a flexible casing 33, said wire connected at one end to the treadle and at its other end to the elbow 41 as by a set screw 34 which also clamps the severed wire end 35 from the handle-bar in the hole 36. Suitable guides are provided for the flexible casing 33, as one 37 upon a bracket 38 on the frame of the motorcycle, and another 39 upon a higher bracket 40 which also affords attachment for the spring 42 for holding the elbow 41 in retracted position, see Figure 3.

Various other structural modifications might be made by those skilled in the art in applying my invention to motorcycles, without departing from the spirit and scope of the invention, and therefore I do not desire to be understood as limiting myself except as required by the following claims when construed in the light of the prior art.

Having thus described the invention, what I claim is:

1. In a motorcycle, the combination with a gas control, of means normally holding said control closed, a laterally projecting pedal mounted to fold idly toward the motorcycle, and means for transmitting depressive motion of said pedal to said control to open the same.

2. In a motorcycle, the combination with a gas control, of means normally holding said control closed, a laterally projecting pedal hinged to fold idly toward the motorcycle, and means connecting said pedal to said control to open the same.

3. In a motorcycle, the combination with a gas control, of means normally holding said control closed, a foot-board, a pedal overlying said foot-board and adapted to engage the same to limit depression, and means connecting said pedal to said control to open the same.

4. In a motorcycle, the combination with a gas control, of means normally holding said control closed, a hinged foot-board, a pedal overlying said foot-board and adapted to fold therewith idly toward the motorcycle, and means for transmitting depressive motion of said pedal to said control to open the same.

5. In a motorcycle, the combination with a gas control, of means normally holding said control closed, a hinged foot board, a pedal mounted to fold idly with said foot-board, and means for transmitting depressive motion of said pedal to said control to open the same.

6. In a motorcycle, the combination with a gas control member having a socket, of means yieldingly holding said member normally in position to close the control, a transmission wire extending into said socket, and means for sliding said wire longitudinally to abut the bottom of the socket and move said member.

7. In a motorcycle, the combination with a gas control member having a socket, of means yieldingly holding said member normally in position to close the control, a flexible casing connecting telescopically with said socket, a wire extending through said casing into said socket, and means for sliding said wire longitudinally to abut the bottom of the socket and move said member.

8. In a motorcycle, the combination with a gas control member, of means yieldingly holding said member normally in position to close the control, a connection extending from the handle-bar to said member to move it against said means, a foot-operable mechanism, and a connection extending from said mechanism to said member to move it against said means, one of said connections permitting movement of the member independent of the other connection.

9. In a motorcycle, the combination with a gas control member, of means yieldingly holding said member normally in position to close the control, a wire extending from the handle-bar to said member to move it against said means and permitting independent movement of the member, a foot pedal and a connection extending from said pedal to said member to move it against said means.

DONALD McDOUGALL.